(12) United States Patent
Schierholt et al.

(10) Patent No.: US 8,433,596 B2
(45) Date of Patent: Apr. 30, 2013

(54) SYSTEM AND METHOD FOR SERVICE PARTS PLANNING

(75) Inventors: Hans Karsten Schierholt, Montreal (CA); Priti Prabhoo, Mountain View, CA (US); Uwe Sodan, Hockenheim (DE)

(73) Assignee: SAP Aktiengesellschaft, Walldorf (DE)

( * ) Notice: Subject to any disclaimer, the term of this patent is extended or adjusted under 35 U.S.C. 154(b) by 3138 days.

(21) Appl. No.: 11/064,665

(22) Filed: Feb. 22, 2005

(65) Prior Publication Data
US 2006/0020485 A1  Jan. 26, 2006

(30) Foreign Application Priority Data

Jul. 20, 2004  (EP) .................................. 04103460
Dec. 28, 2004  (EP) .................................. 04107028

(51) Int. Cl.
*G06Q 10/00*  (2012.01)
(52) U.S. Cl.
USPC ....... 705/7.12; 705/7.11; 705/7.25; 705/7.37; 705/28; 700/99; 709/226
(58) Field of Classification Search ................. 705/7.11, 705/7.12, 7.25, 7.37, 28; 700/99; 709/226
See application file for complete search history.

(56) References Cited

U.S. PATENT DOCUMENTS 7,210,624 B1 * 5/2007 Birjandi et al. ............... 235/385
7,337,031 B1 * 2/2008 Birjandi et al. ................ 700/99

OTHER PUBLICATIONS

Hausman and Scudder, Priority Scheduling Rules for Repairable Inventory Systems, Management Science, vol. 28, No. 11 (Nov. 1982), pp. 1215-1232.*
Scudder, Priority Scheduling and Spares Stocking Policies for a Repair Shop: The Multiple Failure Case, Management Science, vol. 30, No. 6 (Jun. 1984), pp. 739-749.*
Scudder and Hausman, Spares Stocking Policies for Repairable Items with Dependent Repair Times, Naval Research Logistics Quarterly, vol. 29, No. 2, Jun. 1982, p. 303-22.*
Cohen et al., Optimizer: IBM's Multi-Echelon Inventory System for Managing Service Logistics, Interfaces 20: Jan. 1-Feb. 1990, p. 65-82.*
Pyke, Priority Repair and Dispatch Policies for Reparable-Item Logistics Systems, Naval Research Logistics, vol. 37, 1990, p. 1-30.*
Al-Bahi, Spare Provisioning Policy Based on Maximization of Availability per Cost Ratio, Computers Ind. Engng vol. 24, No. 1, 1993, p. 81-90.*

\* cited by examiner

*Primary Examiner* — Justin M Pats
(74) *Attorney, Agent, or Firm* — Blakely, Sokoloff, Taylor & Zafman LLP

(57) ABSTRACT

Embodiments of the invention are generally directed to a system and method for service parts planning in a network having one or more service parts. For at least a subset of the one or more service parts, a calculation is performed to determine a location within the network at which allocating the service part provides the greatest gain in system availability per item cost. In an embodiment, the calculations are based, at least in part on machine-specific information. In one embodiment, inventory position is determined based, at least in part, on a unique identifier associated with a service part.

33 Claims, 7 Drawing Sheets

SYSTEM AND METHOD FOR SERVICE PARTS PLANNING

TECHNICAL FIELD

Embodiments of the invention generally relate to the field of materials management and, more particularly, to a system and method for service parts planning.

BACKGROUND

In many cases, repairable parts that are part of a larger system or machine are not disposed of after they are removed from the system or machine in which they are used. Instead, these "service parts" are, for reasons of cost and time, typically shipped to a repair and refurbishment location and prepared for reuse. The term "repairable part" broadly refers to a part that can be economically restored to a serviceable condition. Typically, a repairable part can be repeatedly rehabilitated to a serviceable condition over a period approximating the life of the system to which it is related. A "service part" is a more generic term which can refer to repairable parts as well as to non-repairable parts (e.g., consumable parts).

The inventory planning for service parts (or, for ease of reference, service parts planning), typically involves, inter alia, balancing the availability of a system against the magnitude of the investment in the service parts for the system. For example, an ample supply of service parts is desirable to maintain continuity in the operations of the system. The capital invested in the service parts, however, is non-revenue generating and perishable if, for example, a service part becomes obsolete.

Service parts planning can be applied to networks having a variety of topologies. These topologies are typically classified based on the number of service parts in the network (e.g., item approach vs. system approach) and the number of hierarchical levels in the network (e.g., single echelon vs. multi-echelon networks). A network having a single type of service part and a flat topology is often referred to as a single part single echelon network. A network having a number of different service parts and a two-level hierarchy is called a multipart two-echelon network. A generalized network having an arbitrary number of service parts and an arbitrary number of hierarchical levels is called a multipart multi-echelon network.

Conventional service parts planning systems typically rely on external information to forecast demand for a service part. For example, the average time between failures for a service part is often used to estimate when a given service part will need service (e.g., maintenance or refurbishment) in the future. These external sources of information do not take into account the individual histories of specific service parts. In addition, there are typically significant limitations on the visibility that a conventional service parts planning systems has into a service parts inventory. For example, conventional service parts planning systems typically do not have visibility into service parts inventory that is in transit between locations within a network or inventory that is in a repair facility.

SUMMARY OF THE INVENTION

Embodiments of the invention are generally directed to a system and method for service parts planning in a network having one or more service parts. For at least a subset of the one or more service parts, a calculation is performed to determine a location within the network at which allocating the service part provides the greatest gain in system availability per item cost. In an embodiment, the calculations are based, at least in part on machine-specific information. In one embodiment, inventory position is determined based, at least in part, on a unique identifier associated with a service part.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for service parts planning in a network having one or more service parts. One objective of service parts planning is to optimize the allocation of service parts to locations with respect to an available budget. Optimization may refer to attempting to maximize system availability with a constrained budget or (inversely) to achieving a given target system availability with a minimum budget. In an embodiment, the service parts planning procedures are based, at least in part on machine-specific information. In one embodiment, inventory position is determined based, at least in part, on a unique identifier associated with a service part. The service parts planning procedures may be based on updated budget information.

Figure 1:
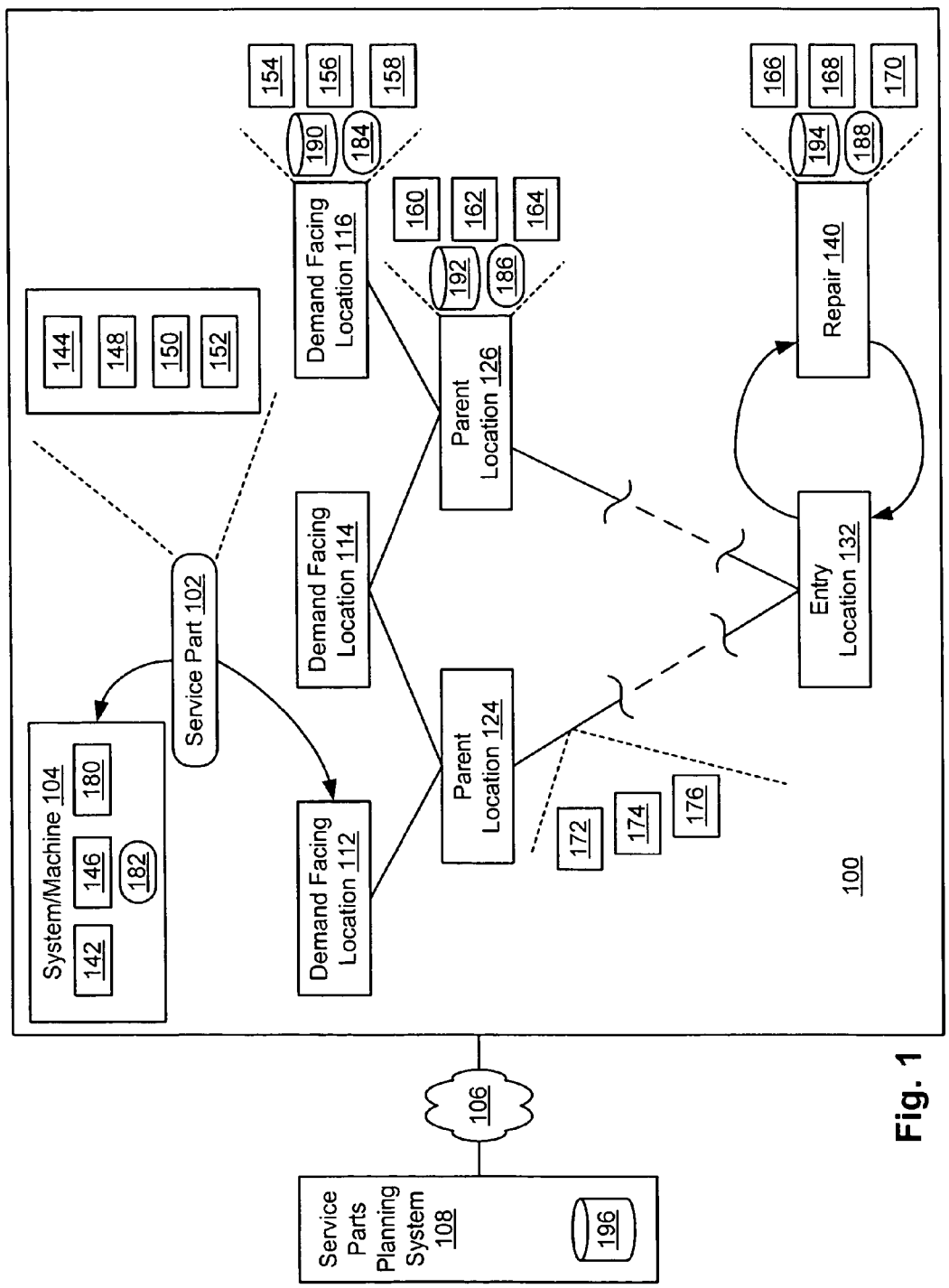
FIG. 1 is a block diagram of selected aspects of a service parts network according to an embodiment of the invention.

FIG. 1 is a block diagram of selected aspects of network 100 according to an embodiment of the invention. Network 100 is a multi-echelon network which includes demand facing locations 112-116, parent locations 124-126, entry location 132, and repair facility 140. The repair facility can also be associated with a non-entry location (e.g., location 126). Network 100 may have an arbitrary number of locations and an arbitrary number of hierarchal levels (e.g., as illustrated by dashed lines in FIG. 1). In an alternative embodiment, network 100 is a single-echelon network (e.g., a multipart single-echelon network or a single part single-echelon).

A demand facing location is a location that provides service parts to systems or machines as needed (and as available). For example, when service part 102 in system/machine 104 fails, demand facing location 112 provides a serviceable instance of service part 102 to system/machine 104. Typically, the defective instance of service part 102 is removed from system/machine 104 and exchanged for a serviceable instance of service part 102 provided by demand facing location 112. The defective instance of service part 102 is (typically) conveyed through the hierarchical levels of network 100 or directly presented to repair facility 140 for refurbishment, maintenance, etc. In the illustrated example, the defective instance of service part 102 may be transferred from demand facing location 112 to parent location 124, and so forth, until it reaches entry location 132. The term "entry location" refers to a location at which one or more service parts may enter network 100 from a supplier. Service Parts may leave the network once they are non-refurbishable.

One or more locations within network 100 may include one or more service parts. For example, in the illustrated embodiment, demand facing location 116 includes service parts 154-158. Similarly, parent location 126 includes service parts 160-164 and repair facility 140 includes service parts 166-170. The service parts illustrated in FIG. 1, (e.g., service parts 160-164 and 166-170) can be multiple instances of the same service part. In addition, zero or more service parts may be in transit between the locations of network 100. For example, service parts 172-176 are in transit between parent location 124 and entry location 132.

In an embodiment, service part 102 includes an identifier to uniquely identify an instance of the service part (e.g., serial number 150). Serial number 150 identifies a specific service part and may further provide a mechanism to distinguish between service parts that have had upgrades, updates, revisions, and the like. Service part 102 may be associated with Advanced Shipping Notification (ASN) 152. ASN 152 may be provided by a sender (e.g., demand facing location 112) to inform a receiver (parent location 124 and/or repair facility 140) that service part 102 is in transit to the receiver. ASN 152 may also provide information such as when service part 102 was sent, when service part 102 is likely to arrive, a brief description of service part 102, and the like. As is further discussed below, serial number 150 and/or ASN 152 may provide visibility into the service part inventory position of network 100.

System/machine 104 includes machine-specific information such as early indicator of failure 142 and machine-specific usage information 146. Similarly, service part 102 may include early indicator of failure 144 and machine-specific usage information 148 of part 102 in a machine. As is further discussed below, machine-specific information enables a service parts planning procedure to convert some unplanned demand for a service part to planned demand for the service part. An early indicator of failure (e.g., 142, 144) broadly refers to an indicator that a machine (and/or a service part) may need maintenance or replacement. Examples of an early indicator of failure include, and are not limited to: variations in temperature, voltage, current, pressure, size, shape, etc.; an error message from error detection logic; and the like.

The illustrated embodiment, of system/machine 104 includes sensor 180. Sensor 180 obtains machine-specific information from system/machine 104 (and/or one or more service parts) and provides the information to, for example, service parts planning system 108. As is further described below, service parts planning system 108 may use the machine-specific information to forecast demand for one or more service parts. Sensor 180 may be any of a variety of digital or analog sensors capable of collecting machine-specific information such as: a thermometer, a voltage meter, a current meter, a counter, a computing device, and the like. In an embodiment, sensor 180 automatically detects an early indicator of failure and alerts a service parts planning system 108 so that service parts, technicians, tools and the like can be timely positioned to provide an appropriate service (e.g., maintenance or repair).

In an embodiment, system/machine 104 provides machine-specific information to service parts planning system 108 through communication element 182. Communication element 182 may be any of a wide variety of wired and wireless communications elements capable of directly or indirectly linking system/machine 104 to service parts planning system 108. In one embodiment, communication element 182 is a wired or wireless network interface linking system/machine 104 to a data network (e.g., a local area network, a wide area network, an intranet, the Internet, and the like). In an alternative embodiment, communication element 182 is a wired or wireless link to a telecommunications network (e.g., a cell phone modem).

In one embodiment, a location within network 100 may collect (e.g., via sensors) and store (at least temporarily) machine-specific information from one or more of the service parts in inventory at the location. For example, locations 116, 126, and 132 respectively include data stores 190, 192, and 194. Each of these data stores store machine-specific information about service parts that are in inventory at the respective locations. For example, data store 190 stores machine-specific information for service parts 154-158. A location may also include a communication element to directly or indirectly communicate the machine-specific information to service parts planning system 108. For example, demand facing location 116 and parent location 126 respectively include communication elements 184 and 186.

A wide range of policies may govern when machine-specific information is communicated to service parts planning system 108. For example, the machine-specific information may be automatically (and/or conditionally) communicated periodically and/or in response to one or more events. In addition, the communication may be synchronous and/or asynchronous. In an embodiment, the machine-specific information is communicated to service parts planning system 108 through network 106. Network 106 may be any kind of wired or wireless network including, for example, a Local Area Network (LAN), a Wide Area Network (WAN), a Metropolitan Area Network (MAN), and/or the Internet.

Service parts planning system 108 provides inventory planning for network 100. For example, service parts planning system 108 may forecast demand for one or more service parts and may determine a substantially optimal distribution for the service parts within network 100. In an embodiment, service parts planning system 108 obtains machine-specific information for one or more service parts (and/or the system(s)/machine(s) associated with the service parts) and stores the machine specific information in, for example, data store 196. Service parts planning system 108 may retrieve the machine-specific information from data store 196 as needed during inventory planning. In an embodiment, service parts planning system 108 is implemented as a computing system (e.g., computing system 700, shown in FIG. 7). The computing system may be either a general-purpose or specialized computing system having logic to provide service parts planning. In one embodiment, service parts planning system 108 is remote from network 100. In an alternative embodiment, service parts planning system 108 is part of a location within network 100.

Machine-specific usage information (e.g., 146, 148) refers to information that provides an indication of how much use a machine (and/or a service part) experiences. Examples of machine-specific usage information include and are not limited to: number of operating hours; number of times a machine specific event has occurred (e.g., take-off/landings of an aircraft or number of items produced by a machine); indicators of wear (e.g., wear on a stamping press); and the like. As is further discussed below, machine-specific usage information (e.g., 146, 148) enables a service parts planning system to estimate demand using actual machine data rather than tabulated data such as estimations of the mean time between failures for a service part.

Selected Processes of an End-to-End Service Parts Management Scenario

Forecasting

The term "forecasting" refers to estimating the demand for one or more service parts within a network (e.g., network 100, shown in FIG. 1). The term "$m_{i,j}$" represents the demand for part i at location j. Demand $m_{i,j}$ can either be given (e.g., for the same time period unit (e.g., weeks, months, etc.) used for lead and repair times) or it can be determined. The determination of demand $m_{i,j}$ may be based, at least in part, on factors such as usage experienced by a service part, the number of base systems within the network, the number of service parts per base system, and the frequency at which the service part is replaced. For example, demand $m_{i,j}$ can be determined in the following way:

(operating hours per time period)*(# of installed base systems)*(# of parts per installed base system)/(mean time between removal).

Similarly, where service part usage is measured in terms of the number of times the service part is used (e.g., the number of flights made by an airplane) demand $m_{i,j}$ can be determined in the following way:

(# of Start/land cycles of aircraft per time period)*(# of parts per aircraft)*(failure rate per start/land cycle).

In one embodiment, the start/land cycles refer to the start/land cycles for all aircraft at that location. Alternatively, the average number of start/land cycles per aircraft multiplied by the number of aircraft may be used. In an embodiment, only demand of potential "stocking locations" is considered when forecasting demand. The term "stocking location" refers to a location (e.g., demand facing location 112 and parent location 124) that is expected to hold a service part. Demand for a service part experienced at non-stocking locations is aggregated to the next higher level in the network location hierarchy. That is, demand is aggregated from locations where the part is not allowed to be stored to a stocking location. In one embodiment, demand $m_{i,j}$ is considered constant when it is used in calculations.

Demand can be classified as planned or unplanned demand. The term planned demand refers to demand for a service part that is (at least to a degree) anticipated by a service parts planning system. Unplanned demand, as the name implies, refers to demand for a service part that is not anticipated by the service parts planning system (e.g., due to an accident, emergency, etc.). While the first is not subject to demand variance it does not need to be "protected" by safety stock. Combining planned and unplanned demand delivers over-protected service. The relationship between planned demand and unplanned demand is complicated because they are interdependent. While service parts cannot (due to lead time) and should not (due to cost) be purchased for planned maintenance tasks if insufficient supply is available, the usage of service parts reserved for unplanned demand can sacrifice service. On the other hand, planning time for service is usually sufficient to position service parts within the network in time for their use.

In an embodiment, demand can be forecasted from historical internal usage in service and/or demand can be determined through external information (such as installed base allocated to a location and measured mean time between planned removal/repair and mean time between unplanned removal/repair). In an embodiment, the service parts planning system has (at least a degree of) integration with plant maintenance data and/or historical usage data provided by plant maintenance. This information is valuable, for example, when an expensive service part having a low demand is critical for the proper functioning of a machine. With average failure rates and demand derived from that data being the most detailed information available, the planning and positioning techniques will consider all installations of the machine equal and assume that a failure of the service part is equally likely to happen in any of those installations. Since overall demand is very low, only a few service parts will be kept at very central locations in order to ship that part to the broken machine as fast as possible. The time between when a service part is shipped from a central location and when a maintenance service technician has access to the service part can be significant.

In an embodiment, the above-described technique is enhanced with the use of machine-specific usage information (e.g., 146-148, shown in FIG. 1) because the machine-specific usage information provides a more accurate basis upon which to strategically position service parts. For example, in an embodiment in which the failure rate is measured by the operating hours of the machine, the likelihood of a failure is dependent on the counter readings of operating hours since the last replacement of that part. In such an embodiment, the likelihood of a failure for a service part is not equal with time any more and thus the expected demand is not equal for each installation of the machine. In an embodiment, machine-specific information is utilized by the planning technique to more strategically position the service parts in the network and to make those parts available more quickly to locations where a failure is more likely to occur. In such an embodiment, the time to service in case of a failure may be reduced. In addition, the same level of service can be reached with less inventory because demand is more accurately forecasted.

In an embodiment, a machine-specific early indicator of failure (e.g., 142-144, shown in FIG. 1) is used to provide a more accurate forecast of demand for one or more service parts. The machine-specific early indicator of failure (e.g. increasing variance in machine temperature or wear measures) can be used to predict an upcoming failure of a service part. In such an embodiment, maintenance or repair can be planned before a disruption actually happens and the part can be positioned ahead of time at an appropriate location within a network (e.g., network 100, shown in FIG. 1). Machine-specific information (e.g., usage and/or early indicator of failure) can turn some unplanned demand into planned demand. A reduction in unplanned demand facilitates a reduction in inventory because there is less of a need to protect against unplanned demand.

Inventory Visibility

The term "inventory visibility" refers to determining the size and distribution of a service parts pool in a network (e.g., network 100, shown in FIG. 1). The term "service parts pool" is a convenient way to collectively refer to the service parts within a location or the entire network. Access to inventory visibility provides a basis for determining whether further investments are necessary to achieve the optimal service level. Inventory visibility includes, for example, determining the serviceable inventory at the different locations, determining the inventory that is in transit to and from repair locations, and determining the inventory in repair facilities.

Inventory visibility throughout the service parts network is the basis of procurement decision making based on limited budgets. In addition, inventory visibility provides a mechanism to determine the expected service levels at customer locations and to determine optimal deployments of service parts within the network. If, for example, a customer stores a service part "in case of emergencies" at its location, the impact of a demand at that location on total machine uptime would not be as urgent as at a location where no part is stored. It is therefore valuable to have visibility into service parts inventory within a network and the inventories of customers and partners. This inventory may be stored at a location or in transit between locations.

In an embodiment, the visibility into inventory not under the direct control of a service parts planning system is achieved through the use of advanced shipping notifications (e.g., ASN 152, shown in FIG. 1). For example, advanced shipping notifications may be used to provide visibility into inventory that is in transit between locations and/or is in transit to the network from a customer or partner. The advanced shipping notifications may be generated after removing a service part from the installed base machine. In one embodiment, the advanced shipping notification provides information to the service parts planning system such as which service part has been sent, from/to which location is it being sent, when was it sent, what is the expected arrival date, etc. The advanced shipping notification may be provided to the service parts planning system (e.g., service parts planning system 108, shown in FIG. 1) through a communication element (e.g., communication elements 182-188, shown in FIG. 1). In embodiment, a sensor (e.g., sensor 180, shown in FIG. 1) automatically detects the generation of an advanced shipping notification and alerts the service parts planning system. The service parts planning system may store the advanced shipping notification in a data store (e.g., data store 196, shown in FIG. 1) and retrieve it, as necessary, during inventory planning.

In one embodiment, the visibility into the service parts inventory of a network (including, perhaps, inventory that is with a customer or partner) is enhanced through the use of a service part serial number (e.g., serial number 150, shown in FIG. 1). The serial number of a service part can provide visibility that is specific to a service part and its history. In an embodiment, serial numbers are used to distinguish service parts that have different updates, upgrades, revisions, configurations, and the like. Serial numbers can be used to further specify whether a part is particularly suited for a specific installed base. If parts are positioned within the service parts network, the individual parts can be deployed based on their fit for the most likely use.

Distribution Resource Planning/Procurement

In an embodiment, Distribution Resource Planning (DRP) is not driven by the projected (serviceable) inventory at the entry location, which is time-shifted and aggregated throughout the network. The reason for this is that such a policy could (e.g., in the case of unusually large demand for a part) lead to the generation of purchase requisitions, which would unnecessarily increase the size of the service parts pool. In an embodiment, the optimal investment strategy includes a policy of replenishing to locations where repair cannot be preformed and to accept eventual backorders.

In one embodiment, the procurement process is directed to maintaining a target service parts pool size. If a service part is scrapped for some reason and the service parts pool decreases below the target size, then a service part may be procured so that the size of service parts pool is balanced. If, on the other hand, the service parts pool does not decrease below the target size when the service part is scrapped, then procurement of the service part is not triggered.

Replenishment/Deployment

In an embodiment, replenishment is based on the following principle: whenever a service part is used at a location and the unserviceable instance of the service part is not repaired at that location, then the service part is replenished from the next higher echelon in the distribution location hierarchy. Stated more abstractly, whenever the service parts pool assigned to a given location falls below the target pool size for that location, replenishment form the next higher echelon in the distribution location hierarchy is triggered.

In an embodiment, the size and distribution of the service parts pool is recalculated. In response to these recalculations, the service part inventory at one location may be decreased in order to increase the service part inventory at another location (or a number of other locations). In one embodiment, if this process cannot be implemented within a reasonable time using regular turnover or regular replenishment channels, then a lateral parts movement may be triggered. The term "lateral parts movement" refers to moving service parts among locations that occupy the same hierarchical level within a network.

Delta Planning

The term "delta planning" refers to conducting service parts planning when the budget allocated for service parts within a network has changed. In an embodiment, if a new budget for purchasing new or replacement service parts becomes available, then delta planning may be triggered. In one embodiment, the system-wide number of parts for each service part is minimally constrained to the size of the current service parts pool, during delta planning. In such an embodiment, delta planning allocates the new budget in a way to provide the best increase in service level starting from the current status quo.

Delta planning does not necessarily imply that retired or scraped parts are replaced. Instead, there may be a number of other investments that provide a more beneficial way to allocate the new budget. For example, a change in demand, a change in installed service parts base, or the presence of a currently non-optimal mix of service parts might suggest that it could be more beneficial to allocate the new budget to other areas.

Parameters and Definitions

A system and method for substantially optimizing service parts planning is provided below with reference to FIGS. 2-7. This description includes reference to a number of parameters and definitions. For ease of reference, these parameters and definitions are provided below.

Parameters

Table 1 provides a list of parameters used in an embodiment of the invention.

TABLE 1

| Parameter | Description |
|---|---|
| $A(S_{i,j})$ | System availability across all locations (averaged). |
| $A_j(S_{i,j})$ | System availability at location j. |
| $S_{i,j}$ | Inventory position (e.g., target stock level) for part i at location j. |
| $\mu_{i,j}$ | Poisson mean for average pipeline of part i at location j. |
| $r_{i,j}$ | Probability of repair of service part i at location j. This probability is 0 if no tools for repair exist at this location. The probability is 1 if the part is always repaired (and never, e.g., put out-of-service). |
| $T_{i,j}$ | Repair lead time for part i at location j. |
| $O_{i,j}$ | Transport time for part i at location j from its parent. |
| $m_{i,j}$ | Demand for part i at location j. For demand facing locations, this is facing demand; for parent locations, this is demand forwarded from the child locations. |
| $c_i$ | Investment (cost) for part i. |

System Availability

The term "system availability" refers to the probability that a system consisting of a set of parts is functioning. The system may be a single location, a set of locations, or the entire network. In an embodiment, the system availability across all demand facing locations in a network is calculated using equation 1:

$$A(S_{i,j}) = \frac{\sum_{j=1}^{J} A_j(S_{i,j})}{J}. \quad (1)$$

The term J represents the number of demand facing locations. As illustrated by equation 1, the system availability across all demand locations is the average of system availability values at each location. In an embodiment, the system availability at location j is given by equation 2:

$$A_j(S_{i,j}) = \prod_{i=1}^{I} A_{i,j}(S_{i,j}). \quad (2)$$

As illustrated by equation 2, the availability at location j is given by the product of the availability for each part at location j. For example, if location j has two parts that each have an availability of 50%, then the probability that both parts are available at the same time is 50% of 50% or, more precisely, the product of the availability for each part.

In an embodiment, the system availability of part i at location j is given by equation 3:

$$A_{i,j}(S_{i,j}) = 1 - PBO_{i,j}(S_{i,0}, S_{i,j}) = \sum_{x=0}^{S_i} \frac{(\mu_{i,j})^x}{x!} e^{-\mu_{i,j}}. \quad (3)$$

As shown by equation 3, the system availability of part i at location j is a summed Poisson distribution with mean $\mu_{i,j}$. In an embodiment, $\mu_{i,j}$ is given by equation 4:

$$\mu_{i,j} = m_{i,j}\left[r_{i,j}T_{i,j} + (1 - r_{i,j})\left(O_{i,j} + \frac{EBO(S_{i,0}, \mu_{i,0})}{m_{i,0}}\right)\right]. \quad (4)$$

Location 0 is the parent location of location j. In a two echelon network, location 0 is the entry location. The expected backorders (EBO) for the parent location depend on the stocking strategy of its parent location.

Expected Backorders

The expected backorders provide an indication of how quickly the inventory position at a location can be built up. In an embodiment the expected backorders are given by equation 5:

$$EBO(S_{i,0}, \mu_{i,0}) = \sum_{x=S_{i,0}+1}^{\infty} (x - S_{i,0})\frac{(\mu_{i,0})^x}{x!} e^{-\mu_{i,0}}. \quad (5)$$

As shown by equation 5, the expected backorders at a parent location are the weighted sum of the probabilities of x backorders at the next higher location in the location hierarchy. In a two echelon hierarchy, location 0 is the entry location. In a network having more than two echelons, location 0 may be an intermediate location.

Pipeline Calculation

The pipeline for a parent location is calculated to be the sum of the demand rolled up from the child locations minus the probability that a service part can be repaired at a child location. In an embodiment, the pipeline is calculated using equation 6:

$$\mu_{i,0} = \sum_{j=1}^{J} m_{i,j}(1 - r_{i,j}). \quad (6)$$

The "$1-r_{i,j}$" term illustrates that only the demand for service parts that cannot be repaired at the child location(s) is rolled up to the parent location.

Cost Function

In an embodiment, the value of the investment made in a service parts pool is calculated according to equation 7:

$$C = \sum_{i=1}^{I} c_i \sum_{j=0}^{J} S_{i,j}. \quad (7)$$

As shown by equation 7, the total investment in a service parts pool is the sum of the value of the individual service parts across all of the locations in the network.

Optimization Function

The optimization of the investment in a service parts pool can have two inverse objectives. The objective can be to achieve the maximum system availability with a constrained budget. Inversely, the objective can be to achieve a target system availability with a minimum budget. In either case, the allocation of budget to service parts and the allocation of a service part among the potential stocking locations in a network are optimized. In an embodiment, the inverse definitions for the optimization function are given by equations 8a and 8b:

$$\text{Minimize C}|A \geq A_{min} \quad (8a);$$

or $$\text{Maximize A}|C \leq C_{max} \quad (8b).$$

Service Parts Planning Procedure

In an embodiment, the generalized procedure for the multipart multi-echelon case is informed by the procedures for more specific cases. Selected aspects of the procedures for certain specific cases are introduced below. These procedures provide a foundation for the generalized procedure described below with reference to FIGS. 2-6.

Single-Part, Single Echelon Procedure

In an embodiment, the system availability of a part in a single echelon network is given by equation 3. Since the Poisson distribution function is steadily increasing, the optimal investment can be determined by increasing S until the maximum budget is reached or until the minimum service level is reached (see, e.g., equations 8a and 8b). In the single-part, single echelon case, equation 4 is reduced to: $\mu_{i,j} = m_{i,j} T_{i,j}$.

Multipart, Single Echelon Procedure

In an embodiment, the system availability for an arbitrary number of service parts when considered at a location is given by equation 2. The distribution of the given budget among the service parts is determined using marginal analysis. Marginal analysis refers to an incremental approach that starts with a minimum $S_{i,j}$ for each service part. Selecting a service part in which to invest is based, at least in part, on which investment yields the greatest gain in system availability per incremental dollar (or other unit of currency) invested. In one embodiment, the marginal analysis includes an assumption that for each service part the gain in system availability decreases with each additional investment in that service part. This precondition is valid (mathematically) if $S_{i,j} > (\mu_{i,j} - 2)$. In an embodiment, this value for $S_{i,j}$ is set as the minimum level for $S_{i,j}$ when performing marginal analysis.

Single-Part, Two-Echelon Procedure

The system availability across all demand facing (child) locations is determined according to equation 1. The various locations (e.g., child locations or parent location) "compete" to determine which location provides the best gain in overall system availability. In an embodiment, the "competition" is implemented in an incremental approach using marginal analysis. While an investment (e.g., increasing $S_{i,j}$) in a demand facing location affects the system availability of this location, this is not the case for an investment in the parent location. The parent location is not considered in the calculation of system availability. It nevertheless indirectly affects system availability by increasing the availability of each child location through reducing the expected backorders in the network-internal distribution (see, e.g., equation 5).

The contribution to the system availability of an investment in a demand facing location is directly computable as the change in availability of that location divided by the number of child locations. In an embodiment, the contribution to system availability in a parent location is calculated by the sum of the effects on child point availability, divided by the number of child locations. The location that yields the largest contribution to system availability is selected for the investment. These procedural elements are repeated until the minimum service level is reached or the budget is exhausted.

Multipart, Two-Echelon Procedure

The system availability for the service parts for each location is calculated using equation 2. In an embodiment, the distribution of the given budget among the service parts is determined through marginal analysis: In an incremental approach starting with a minimum $S_{i,j}$ for each part, the investment for that part that yields the greatest gain in system availability per incremental dollar invested is increased. A simplification to the marginal analysis recognizes that the increase in system availability per dollar invested can refer to the availability of each single part only and not to the system availability. As total system availability is calculated as the mean of the location system availabilities and not as a multiplication of system-wide part availabilities, calculating the exact optimal investment decision involves frequent recalculation of the system availability at all locations, which is a computationally intensive process. Nevertheless, for part availabilities close to 100% those approaches become approximately equal. This simplification can again lead to decisions which result in investment suggestions slightly below the efficiency frontier (the optimal distribution). This precondition is valid (mathematically) if $S_{i,j} > (\mu_{i,j} - 2)$. In an embodiment, this value for $S_{i,j}$ is set as the minimum level for $S_{i,j}$ when performing marginal analysis.

Multipart, Multi-Echelon Procedure

In an embodiment, the procedures as described for the two-echelon case can be extended to determine the system availability for a part in a higher echelon structure. In such an embodiment, repair probabilities are applied to the intermediate parent locations and the repair lead time at the entry location includes the average transport time from the child location to the repair facility and to the entry location. The allocation procedure in a multi-echelon network becomes increasingly complex. In an embodiment, service parts are again incrementally allocated to the location where they contribute most to system availability. In one embodiment, the multipart multi-echelon procedure includes additional checks to provide a substantially optimal result.

Turning now to FIGS. 2-6, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Figure 2:
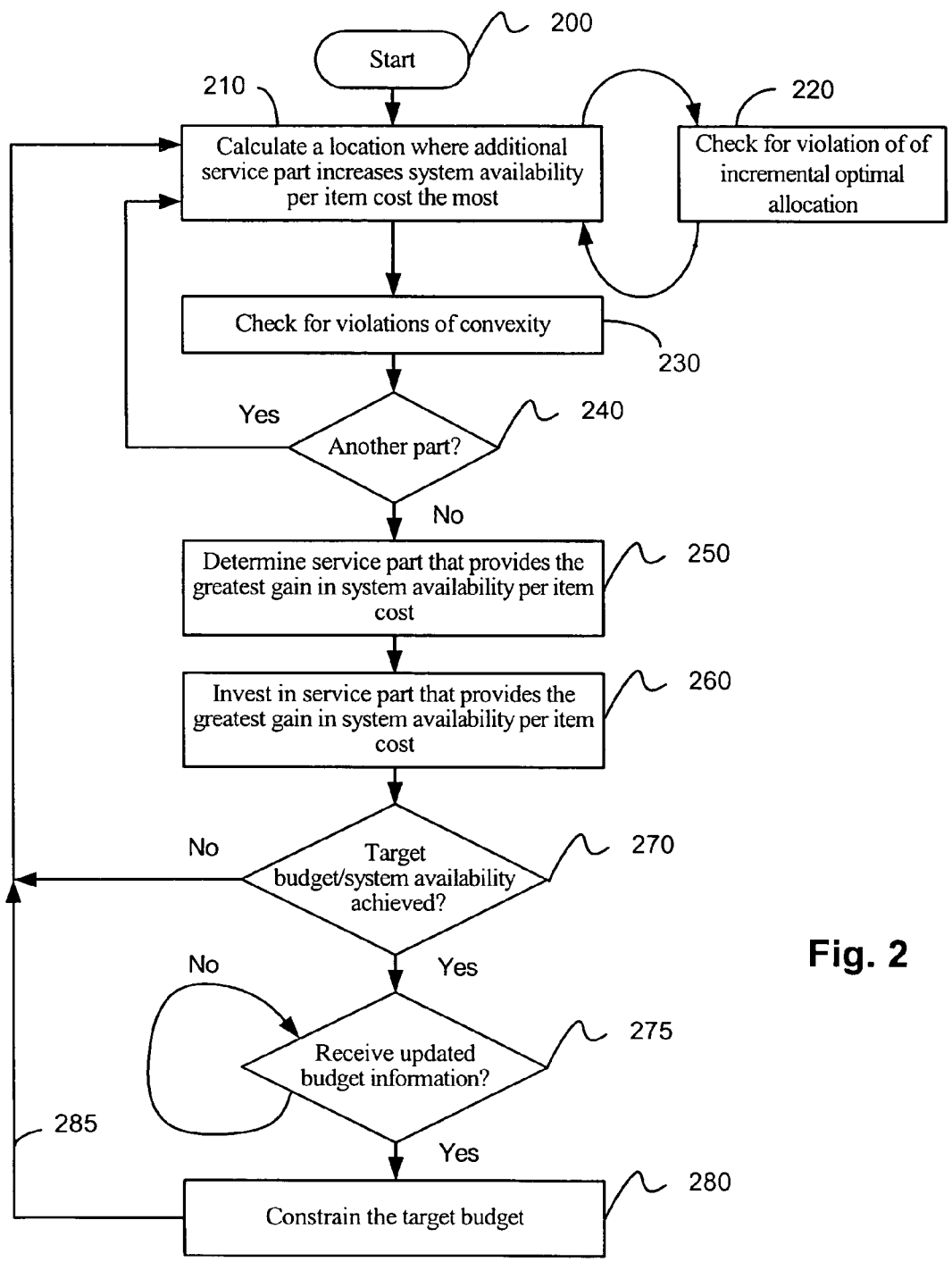
FIG. 2 is a flow diagram illustrating certain aspects of a method for service parts planning in a network, according to an embodiment of the invention.
Figure 3:
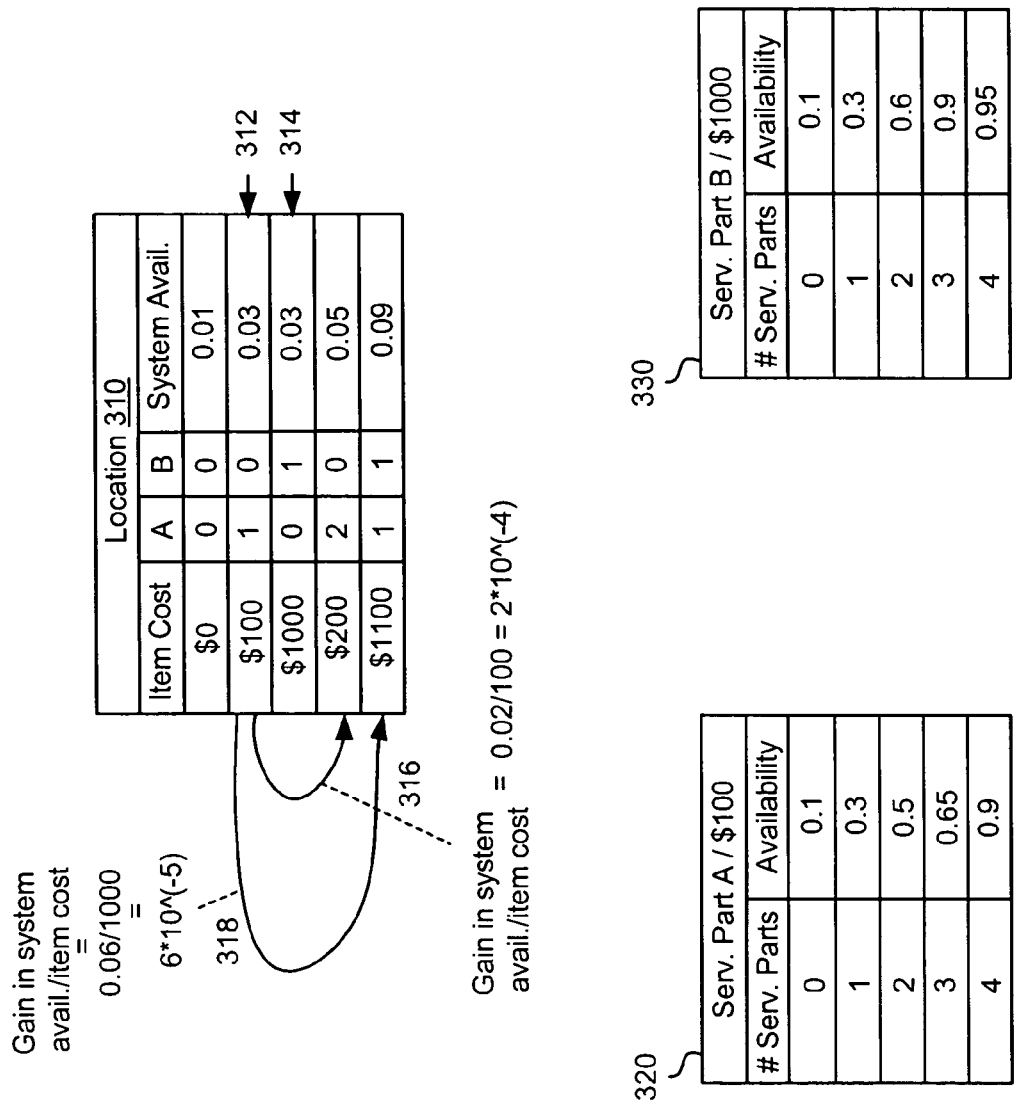
FIG. 3 is a block diagram illustrating the application of marginal analysis to service parts planning, according to an embodiment of the invention.

FIG. 2 is a-flow diagram illustrating certain aspects of a method for service parts planning in a multi-echelon network, according to an embodiment of the invention. Referring to process block 210, the location where an additional service part increases system availability the most is determined. In one embodiment, this location is determined based, at least in part, on marginal analysis. FIG. 3 is a block diagram illustrating the application of marginal analysis to service parts planning according to an embodiment of the invention. Location 310 stocks service part A (having a per item cost of $100) and service part B (having a per item cost of $1000). Tables 320 and 330 respectively show system availability as a function of the number of instances for service parts A and B.

Referring to 312, the system availability for location 310 is 0.03 if 1 instance of service part A and 0 instances of service part B are stocked at location 310. Similarly, reference number 314 shows that the system availability for location 310 is 0.03 if 0 instances of service part A and 1 instance of service part B are stocked at location 310. Marginal analysis may be used to determine whether location 310 experiences a greater gain in system availability per item cost if an investment is made in either service part A or service part B. If a second instance of service part A is allocated to location 310 the gain in system availability per item cost is $2*10^{-4}$ as shown by 316. If an instance of service part B is allocated to location 310, the gain in system availability per item cost is $6*10^{-5}$ as shown by 316. Thus, in the illustrated embodiment, a greater gain in system availability per item cost is achieved by investing in service part A.

Figure 4:
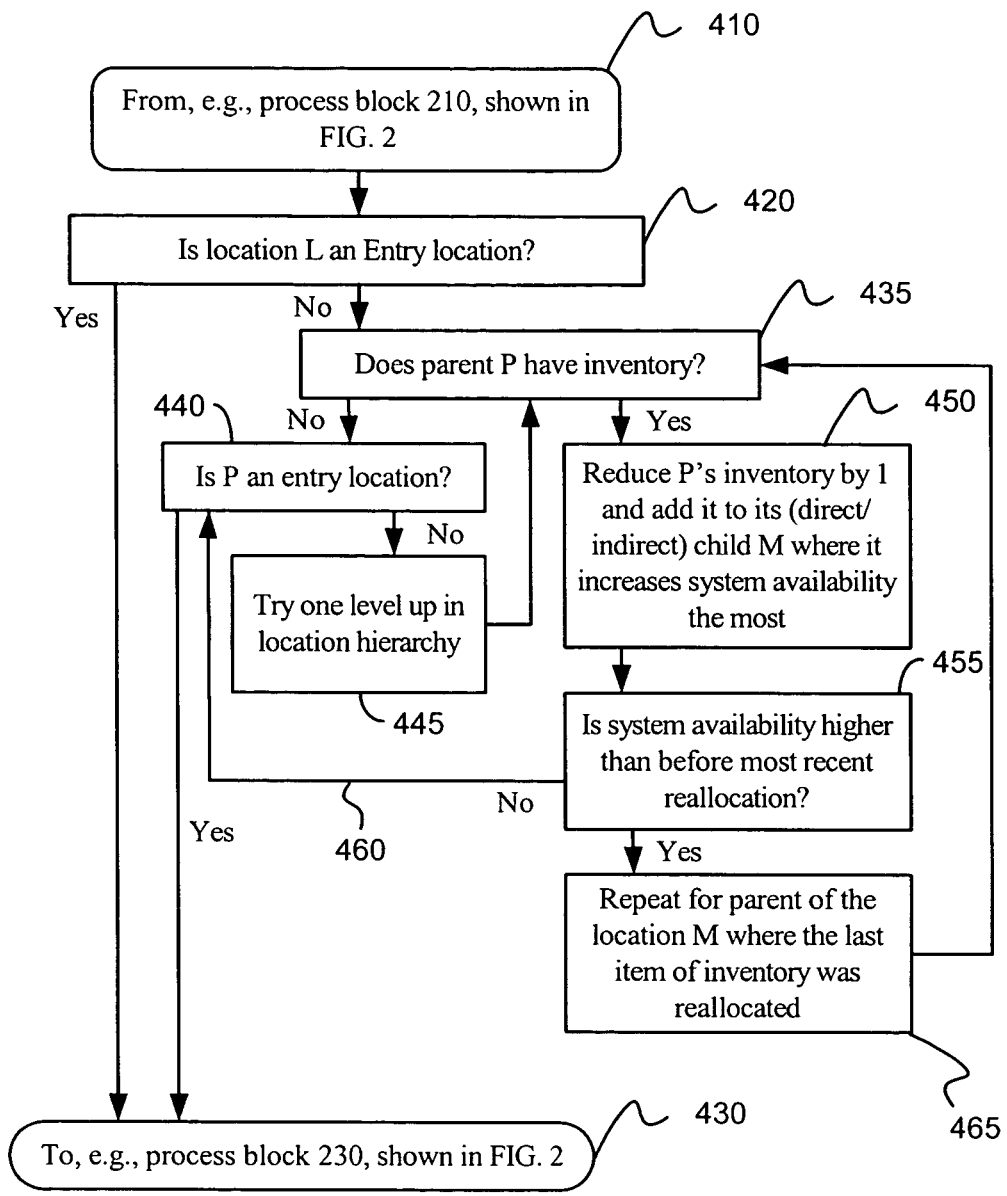
FIG. 4 is a flow diagram illustrating certain aspects of a method for addressing violations of incremental optimal allocation, according to an embodiment of the invention.

In an embodiment, the service parts planning procedure checks for violations of incremental optimal allocation as shown by process block 220. The term "violation of incremental optimal allocation" refers to optimal allocation distributions that involve the combination of (1) increasing the inventory at a location and (2) reallocating a service part (or parts) among two or more locations (e.g., from a parent location to a child location). FIG. 4 is a flow diagram illustrating certain aspects of a method for addressing violations of incremental optimal allocation, according to an embodiment of the invention.

Referring to process block 410, the service parts planning procedure checks for violations of incremental optimal allocation in conjunction with selecting a location at which the allocation of a service part maximally increases system availability per item cost. In one embodiment, these checks are directed to determining whether a higher gain in system availability can be achieved by reallocating a part from the location's parent to a child location providing the largest gain in system availability per item cost. This reallocation may be repeated until the gain in system availability per item cost decreases. Referring to process block 420, the procedure determines whether the location (e.g., as calculated in process block 210, shown in FIG. 2) is an entry location. If the location is an entry location, then it does not have a parent location and the procedure exits as shown by 430.

Referring to process block 435, the procedure determines whether the location's parent has inventory (e.g., has an instance of a service part). If the parent does not have inventory, then the procedure determines whether the parent is an entry location as shown by 440. If the parent is not an entry location, then the procedure is applied to a location that is one level higher in the location hierarchy as shown by 445.

If the parent (or a location selected at, e.g., 445) does have inventory, then the procedure reallocates an instance of the service part from the parent to a child location as shown by 450. In an embodiment, the service part is reallocated to the child that provides the greatest gain in system availability per item cost. The procedure compares the current gain in system availability per item cost to the gain in system availability per item cost prior to the most recent reallocation at 455. If the current gain in system availability per item cost is not greater than it was prior to the most recent reallocation, then the procedure checks a location that is one level higher in the location hierarchy as shown by 460. On the other hand, if the gain in system availability per item cost is greater than it was prior to the most recent reallocation, then the procedure is repeated for the parent of the location where the last item of inventory was reallocated as shown by 465. In an embodiment, this procedure is repeated until the entry location is encountered.

In the multi-echelon environment, the delta in system availability due to an incremental investment in one service part is not necessarily convex. For example, the gain in system availability per item cost may be greater if two (or more) instances of a service part are allocated to a location. Referring again to FIG. 2, in an embodiment, the service parts planning procedure checks for violations of convexity as shown by 230. In one embodiment, checking for violations of convexity includes determining whether the delta in system availability per item cost increases (or decreases) as the inventory position (e.g., 1, 2, 3, etc.) of a service part at a location increases. This procedure can avoid interior points in an otherwise convex investment-system availability curve.

Figure 5:
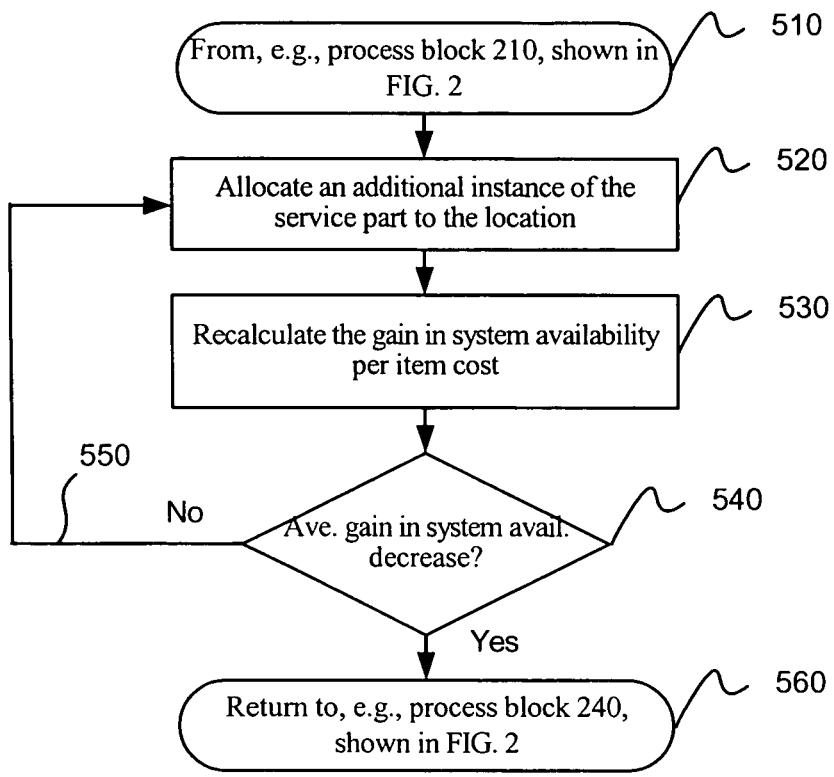
FIG. 5 is a flow diagram illustrating certain aspects of a method for addressing violations of convexity, according to an embodiment of the invention.

FIG. 5 is a flow diagram illustrating certain aspects of a method for addressing violations of convexity, according to an embodiment of the invention. Referring to process block 510, the procedure checks for a violation of convexity after calculating a location where the allocation of a service part provides the greatest gain in system availability per item cost. The procedure allocates an additional instance of the service part to the location at 520. The procedure then recalculates the gain in system availability per item cost based, at least in part, on the current number of instances of the service part at the location. Referring to process block 540, the procedure determines whether the average gain in system availability per item cost decreased after allocating the additional instance of the service part. If the average gain in system availability per item cost has not decreased, then the procedure allocates an additional instance of the service part to the location as shown by 550. In an embodiment, the procedure is repeated until the average gain in system availability decreases as shown by 560.

Referring again to FIG. 2, the procedure for calculating a location where an additional service part maximally increases the system availability per item cost is repeated for each service part in the network as shown by 240. The procedure determines the service part that provides the greatest gain in system availability per item cost at 250. In an embodiment, an investment is made in the service part that provides the greatest gain in system availability per item cost as shown by 260. In one embodiment, the procedure is repeated until either a budget is expended or a target system availability is achieved as shown by 270.

Referring to process block 275, the service parts planning system receives updated budget information (e.g., delta planning). The target-budget is constrained based, at least in part, on the updated budget information at 280. For example, the value of the target budget may be replaced by the value of the budget that has been allocated for service parts during delta planning. In an embodiment, the allocation of service parts to locations is recalculated based, at least in part, on the new value of the budget as shown by 285. In an embodiment, the starting inventory position during the recalculation is determined by the inventory position just prior to receiving the updated budget information.

Figure 6:
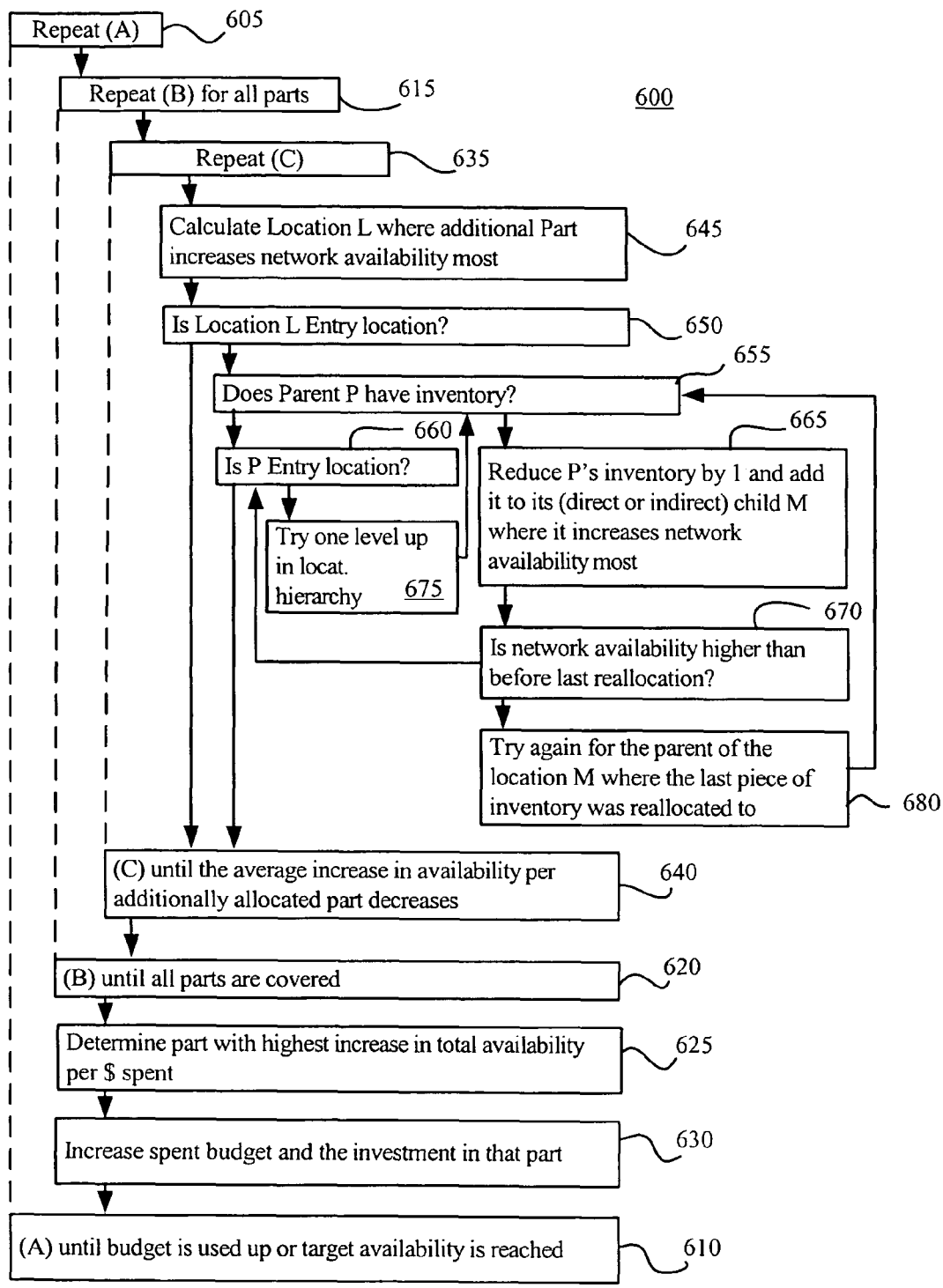
FIG. 6 is a flow diagram illustrating certain aspects of a method for service parts planning that checks for violations of incremental optimal allocation and violations of convexity, according to an embodiment of the invention.

FIG. 6 is a flow diagram illustrating certain aspects of a method for service parts planning that checks for violations of incremental optimal allocation and violations of convexity, according to an embodiment of the invention. Process blocks 605 and 610 form loop A of procedure 600. Similarly, process blocks 615 and 620 form loop B of procedure 600. Loop B cycles through each service part within a service parts pool and determines the gain in system availability per item cost for each service part. Referring to process block 625, the procedure determines the service part that currently provides the greatest gain in system availability per item cost. The budget expended for that service part is increased at 630. Loop A repeats the procedure until the budget is expended or a target availability is reached.

Referring to process block 645, procedure 600 calculates, for each service part, which location within a network provides the greatest gain in system availability per item cost. In an embodiment, this calculation is based, at least in part, on marginal analysis (e.g., as illustrated in FIG. 3). In certain cases, obtaining the greatest gain in system availability per item cost involves the combination of (1) increasing the inventory at a location and (2) reallocating a service part (or parts) among two or more locations (e.g., from a parent location to a child location). The phrase "checking for violations of optimal allocation" refers to determining whether obtaining the greatest gain includes reallocating a service part (or parts) among two or more locations. In an embodiment, procedure 600 provides checking for violations of optimal allocation. In the illustrated embodiment, these checks are implemented by process blocks 650-680. The procedure implemented in process blocks 650-680 is substantially similar to the procedure described with reference to FIG. 4. In an alternative embodiment, checking for violations of optimal allocation may include more process elements, fewer process elements, and/or different process elements.

In certain cases, obtaining the greatest gain in system availability per item cost involves checking for violations of convexity (e.g., as described above with reference to FIG. 5). In an embodiment, checking for violations of convexity includes determining whether the gain in system availability per item cost is greater when more than one instance of a service part is allocated to a location. For example, allocating a first instance of a service part may provide a gain of two percent in system availability per dollar spent on the service part. Allocating a second instance of the service part, however, may provide a gain of ten percent in system availability per dollar spent. In such cases, it may be preferable to allocate two instances of the service part to the location to achieve the greatest gain in service availability per item cost.

In the illustrated embodiment, a check for violations of convexity is performed at process block 640. In an embodiment, checking for violations of convexity includes repeating loop C until the average increase in system availability per additionally allocated service part decreases. In one embodiment these checks are substantially similar to the checks described above with reference to FIG. 5. In an alternative embodiment, checking for violations of convexity may include more process elements, fewer process elements, and/or different process elements than those illustrated in FIG. 5.

Figure 7:
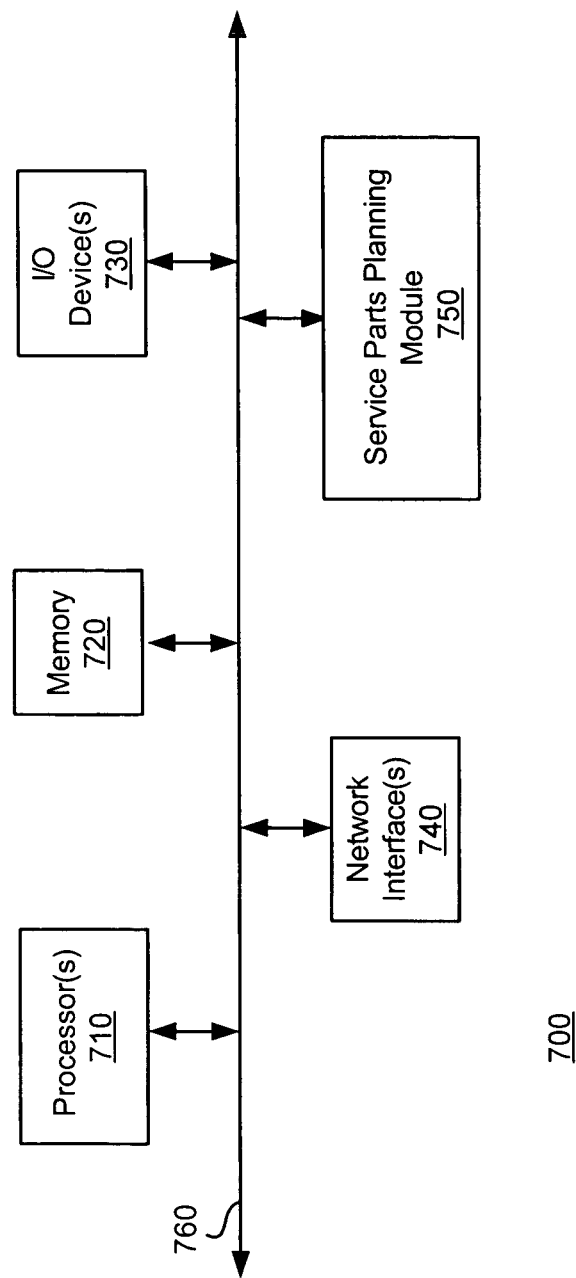
FIG. 7 is a block diagram of a computing system implemented according to an embodiment of the invention.

FIG. 7 is a block diagram of computing system 700 implemented according to an embodiment of the invention. Computing system 700 may include: processor(s) 710, memory 720, one or more Input/Output devices 730, network interface(s) 740, and service parts planning module 750. The illustrated elements may be connected together through system interconnection 760. Processor(s) 710 may include a microprocessor, microcontroller, field programmable gate array (FPGA), application specific integrated circuit (ASIC), central processing unit (CPU), programmable logic device (PLD), and similar devices that access instructions from system storage (e.g., memory 720), decode them, and execute those instructions by performing arithmetic and logical operations.

Service parts planning module 750 may enable computing system 700 to determine a service parts distribution in a multipart multi-echelon network. Service parts planning module 750 may be executable content, control logic (e.g., ASIC, PLD, FPGA, etc.), firmware, or some combination thereof, in an embodiment of the invention. In embodiments of the invention in which service parts planning module 750 is executable content, it may be stored in memory 720 and executed by processor(s) 710.

In an embodiment, service parts planning module 750 is part of a multi-tiered network. The multi-tiered network may be implemented using a variety of different application technologies at each of the layers of the multi-tier architecture, including those based on the Java 2 Enterprise Edition™ ("J2EE") platform, the Microsoft .NET platform, the Websphere platform developed by IBM Corporation, and/or the Advanced Business Application Programming ("ABAP") platform developed by SAP AG.

Memory 720 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 720 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 720 may store program modules such as routines, programs, objects, images, data structures, program data, and other program modules that perform particular tasks or implement particular abstract data types that facilitate system use.

One or more I/O devices 730 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 760 permits communication between the various elements of computing system 700. System interconnection 760 may include a wide variety of signal lines including one or more of a memory bus, peripheral bus, local bus, host bus, bridge, optical, electrical, acoustical, and other propagated signal lines.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for service parts planning in a network having one or more service parts comprising:
 (a) for each of at least a subset of the one or more service parts, calculating, for the service part, system availability per cost of the service part for each of a plurality of locations within the network, the system availability is a probability that the service part is functioning, wherein the calculating is based, at least in part, on machine-specific information that includes at least one of machine-specific usage information, and machine-specific early indicator of failure information;
(b) determining, by a computer, which change in quantity of a service part of the at least the subset of the one or more service parts at a location of the plurality of locations results in a greatest gain in system availability per cost of the service part; and
(c) increasing an investment in the service part at the location that results in the greatest gain in system availability per cost of the service part.

2. The method of claim 1, further comprising:
repeating (a) through (c) until at least one of,
a target budget is expended; and
a target system availability is achieved.

3. The method of claim 1, wherein the calculating comprises:
receiving the machine-specific information associated with the service part;
determining a demand for the service part based, at least in part, on the machine-specific information; and
allocating the service part to a location based, at least in part, on the demand.

4. The method of claim 3, further comprising:
storing the machine-specific information in a machine-specific information data store; and
retrieving the machine-specific information from the machine-specific information data store.

5. The method of claim 2, further comprising:
receiving machine-specific information indicating a potential demand for a service part;
positioning the service part within the network based, at least in part, on the machine-specific information.

6. The method of claim 2, further comprising:
determining an inventory position for each of at least the subset of the one or more service parts.

7. The method of claim 6, wherein determining the inventory position for each of at least the subset of the one or more service parts comprises:
determining whether a service part is in transit to the location within the network.

8. The method of claim 7, wherein determining whether the service part is in transit to the location within the network comprises:
determining whether the service part is in transit to the location within the network based, at least in part, on an advanced shipping notification associated with the service part.

9. The method of claim 8, wherein determining whether the service part is in transit to the location within the network based, at least in part, on the advanced shipping notification associated with the service part comprises:
receiving the advanced shipping notification from the location within the network; and
obtaining service part transit information from the advanced shipping notification.

10. The method of claim 9, wherein determining whether the service part is in transit to the location within the network based, at least in part, on the advanced shipping notification associated with the service part further comprises:
storing the advanced shipping notification in a machine-specific information data store; and
retrieving the advanced shipping notification from the machine-specific information data store.

11. The method of claim 8, wherein determining the inventory position for each of at least the subset of the one or more service parts comprises:
determining the inventory position for each of at least the subset of the one or more service parts based, at least in part, on a serial number associated with the part.

12. The method of claim 2, further comprising:
receiving updated budget information specifying an updated budget allocated to the network; and
constraining the target budget based, at least in part, on the updated budget information.

13. The method of claim 12, further comprising:
repeating (a) through (c) until the target budget is expended.

14. An apparatus comprising:
a service parts planning module to provide, at least in part, service parts planning for a network having one or more service parts; and
a processor and logic executable thereon to, (a) for each of at least a subset of the one or more service parts,
calculate, for the service part, system availability per cost of the service part for each of a plurality of locations within the network, the system availability is a probability that the service part is functioning, wherein the calculation is based, at least in part, on machine-specific information that includes at least one of machine-specific usage information, and machine-specific early indicator of failure information;
(b) determine which change in quantity of a service part of the at least the subset of the one or more service parts at a location of the plurality of locations results in a greatest gain in system availability per cost of the service part; and
(c) increase an investment in the service part at the location that results in the greatest gain in system availability per cost of the service part.

15. The apparatus of claim 14, wherein the logic executable thereon further comprises logic to:
repeat (a) through (c) until at least one of,
a target budget is expended; and
a target system availability is achieved.

16. The apparatus of claim 15, wherein the logic executable thereon further comprises logic to:
receive machine-specific information indicating a potential demand for a service part;
position the service part within the network based, at least in part, on the machine-specific information.

17. The apparatus of claim 15, wherein the logic executable thereon further comprises logic to:
determine an inventory position for each of at least the subset of the one or more service parts.

18. The apparatus of claim 17, wherein the logic executable thereon further comprises logic to:
determine whether the service part is in transit to the location within the network.

19. The apparatus of claim 18, wherein the logic executable thereon to determine whether the service part is in transit to the location within the network comprises logic to:
determine whether the service part is in transit to the location within the network based, at least in part, on an advanced shipping notification associated with the service part.

20. The apparatus of claim 17, wherein the logic executable thereon to determine the inventory position for each of at least the subset of the one or more service parts comprises logic to:

determine the inventory position for each of at least the subset of the one or more service parts based, at least in part, on a serial number associated with the part.

21. The apparatus of claim 15, wherein the logic executable thereon further comprises logic to:
receive updated budget information specifying an updated budget allocated to the network; and
constrain the target budget based, at least in part, on the updated budget information.

22. The apparatus of claim 21, wherein the logic executable thereon further comprises logic to:
repeat (a) through (c) until the target budget is expended.

23. An article of manufacture for service parts planning in a network having one or more service parts, the article of manufacture comprising a non-transitory electronically accessible medium providing instructions that, when executed by an apparatus, cause the apparatus to:
(a) for each of at least a subset of the one or more service parts, calculate, for the service part, system availability per cost of the service part for each of a plurality of locations within the network, the system availability is a probability that the service part is functioning, wherein the instruction causing the machine to calculate base the calculation, at least in part, on machine-specific information that includes at least one of machine-specific usage information, and machine-specific early indicator of failure information;
(b) determine which change in quantity of a service part of the at least the subset of the one or more service parts at a location of the plurality of locations results in a greatest gain in system availability per cost of the service part; and
(c) increase an investment in the service part at the location that results in the greatest gain in system availability per cost of the service part.

24. The article of manufacture of claim 23, wherein the electronically accessible medium provides further instructions that, when executed by the apparatus, cause the apparatus to:
repeat (a) through (c) until at least one of,
a target budget is expended; and
a target system availability is achieved.

25. The article of manufacture of claim 23, wherein the instructions to calculate cause the apparatus to:
receive the machine-specific information associated with the service part;
determine a demand for the service part based, at least in part, on the machine-specific information; and
allocate the service part to a location based, at least in part, on the demand.

26. The article of manufacture of claim 25, wherein the electronically accessible medium provides further instructions that, when executed by the apparatus, cause the apparatus to:
store the machine-specific information in a machine-specific information data store; and
retrieve the machine-specific information from the machine-specific information data store.

27. The article of manufacture of claim 25, wherein the electronically accessible medium provides further instructions that, when executed by the apparatus, cause the apparatus to:
determine an inventory position for each of at least the subset of the one or more service parts.

28. The article of manufacture of claim 27, wherein the instructions that, when executed by the apparatus, cause the apparatus to determine the inventory position for each of at least the subset of the one or more service parts, cause the apparatus to:
determine whether the service part is in transit to the location within the network based, at least in part, on an advanced shipping notification associated with the service part.

29. The article of manufacture of claim 28, wherein the instructions that, when executed by the apparatus, cause the apparatus to determine whether the service part is in transit to the location within the network based, at least in part, on the advanced shipping notification associated with the service part, cause the apparatus to:
receive the advanced shipping notification from the location within the network; and
obtain service part transit information from the advanced shipping notification.

30. The article of manufacture of claim 29, wherein the instructions that, when executed by the apparatus, cause the apparatus to determine whether the service part is in transit to location within the network based, at least in part, on the advanced shipping notification associated with the service part, further cause the apparatus to:
store the advanced shipping notification in a machine-specific information data store; and
retrieve the advanced shipping notification from the machine-specific information data store.

31. The article of manufacture of claim 27, wherein the instructions that, when executed by the apparatus, cause the apparatus to determine an inventory position for each of at least the subset of the one or more service parts, cause the apparatus to:
determine the inventory position for each of at least the subset of the one or more service parts based, at least in part, on a serial number associated with the part.

32. The article of manufacture of claim 25, wherein the electronically accessible medium provides further instructions that, when executed by the apparatus, cause the apparatus to:
receive updated budget information specifying an updated budget allocated to the network; and
constrain the target budget based, at least in part, on the updated budget information.

33. The article of manufacture of claim 32, wherein the electronically accessible medium provides further instructions that, when executed by the apparatus, cause the apparatus to:
repeat (a) through (c) until the target budget is expended.

* * * * *